United States Patent
Paulsen et al.

(10) Patent No.: US 11,460,069 B2
(45) Date of Patent: Oct. 4, 2022

(54) BELT RETRACTOR FOR A SAFETY BELT DEVICE

(71) Applicant: Joyson Safety Systems Germany GmbH, Aschaffenburg (DE)

(72) Inventors: Rüdiger Paulsen, Ulm (DE); Hermann Hasse, Lonsee (DE); Carsten Felber, Jettingen-Scheppach (DE); Felix Hoffmann, Ulm (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 1028 days.

(21) Appl. No.: 16/093,562

(22) PCT Filed: Apr. 3, 2017

(86) PCT No.: PCT/DE2017/200028
§ 371 (c)(1),
(2) Date: Oct. 12, 2018

(87) PCT Pub. No.: WO2017/178020
PCT Pub. Date: Oct. 19, 2017

(65) Prior Publication Data
US 2021/0190137 A1    Jun. 24, 2021

(30) Foreign Application Priority Data
Apr. 16, 2016    (DE) .................... 10 2016 206 448.7

(51) Int. Cl.
*B60R 22/46* (2006.01)
*F16C 17/10* (2006.01)

(52) U.S. Cl.
CPC .............. *F16C 17/10* (2013.01); *B60R 22/46* (2013.01); *F16C 2326/01* (2013.01)

(58) Field of Classification Search
CPC .. B60R 22/46; B60R 2022/4642; F16C 17/10
See application file for complete search history.

(56) References Cited

U.S. PATENT DOCUMENTS

| 4,307,852 A | 12/1981 | Seifert et al. |
| 6,113,146 A | 9/2000 | Mautsch et al. |

(Continued)

FOREIGN PATENT DOCUMENTS

| CN | 1334771 A | 2/2002 |
| CN | 1836940 A | 9/2006 |

(Continued)

OTHER PUBLICATIONS

First Office Action dated Oct. 26, 2020 issued in related Chinese Application No. 201780018573.9 by the Chinese Patent Office.

(Continued)

*Primary Examiner* — Sang K Kim
(74) *Attorney, Agent, or Firm* — Gordon Rees Scully Mansukhani, LLP

(57) ABSTRACT

The invention relates to a belt retractor (10) for a safety belt device, comprising a belt reel (20) for winding and unwinding the safety belt.
According to the invention, it is provided that at least one reel end (21) of the belt reel (20) is mounted in a bearing which comprises at least two bearing sections (110, 120, 150) having different play.

14 Claims, 2 Drawing Sheets

(56) References Cited

U.S. PATENT DOCUMENTS

Figure 1:
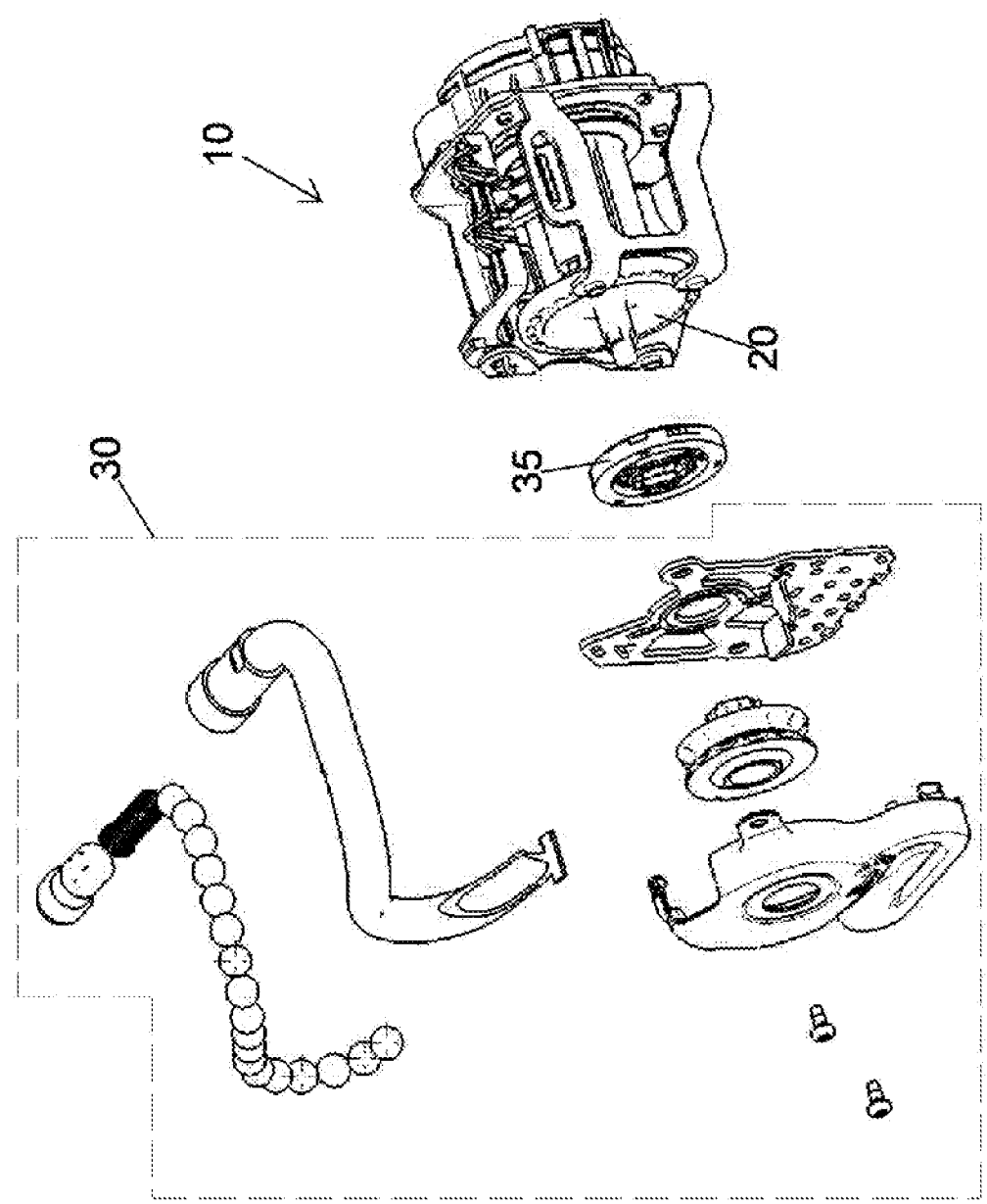

| | | | |
|---|---|---|---|
| 6,354,528 B1 | 3/2002 | Nagata et al. | |
| 6,446,897 B1 * | 9/2002 | Arima | F16D 41/18 |
| | | | 60/632 |
| 6,511,008 B1 * | 1/2003 | Oda | B60R 22/36 |
| | | | 242/376.1 |
| 8,584,980 B2 | 11/2013 | Clute et al. | |
| 9,150,190 B2 * | 10/2015 | Jessup | A62B 35/0093 |
| 2006/0214043 A1 | 9/2006 | Nomura | |
| 2006/0266865 A1 | 11/2006 | Tanaka et al. | |
| 2009/0218803 A1 | 9/2009 | Friedsmann et al. | |
| 2011/0215185 A1 | 9/2011 | Clute et al. | |
| 2015/0041579 A1 | 2/2015 | Bedak et al. | |

FOREIGN PATENT DOCUMENTS

| | | |
|---|---|---|
| CN | 1876450 A | 12/2006 |
| CN | 102227341 A | 10/2011 |
| CN | 102227342 A | 10/2011 |
| DE | 197 50 903 A1 | 6/1999 |
| DE | 10 2008 008 041 A1 | 7/2008 |
| DE | 102014009618 A1 | 12/2015 |
| EP | 2 828 129 B1 | 5/2016 |
| JP | 2002145012 A | 5/2002 |
| JP | 2002200965 A | 7/2002 |
| WO | WO 2012/016567 A1 | 2/2012 |

OTHER PUBLICATIONS

International Search Report and Written Opinion dated Jul. 28, 2017 in International Application No. PCT/DE2017/200028; filed Apr. 3, 2017.

* cited by examiner

BELT RETRACTOR FOR A SAFETY BELT DEVICE

The invention relates to a belt retractor for a safety belt device comprising a belt reel for winding and unwinding the safety belt.

The requirements for motor vehicles with regard to noise emissions are becoming increasingly stringent. This development further relates to belt retractors and the noises which are produced at the bearing points of the belt reel.

Accordingly, the object of the invention is to specify a belt retractor in which structure-borne noise occurring in the region of the bearing of the belt reel passes to the outside as little as possible.

This object is achieved according to the invention by a belt retractor having the features as claimed in claim 1. Advantageous embodiments of the belt retractor according to the invention are specified in the subclaims.

Accordingly, it is provided according to the invention that at least one reel end of the belt reel is mounted in a bearing which comprises at least two bearing sections having different play.

An essential advantage of the belt retractor according to the invention is that the design of the two bearing sections with variable play permits different functionalities and, for example, permits one of the bearing sections to be provided specifically for low-noise bearing of the belt reel for normal operation and a further bearing section to be provided as a heavy-duty bearing section in the case of a high mechanical load, as may occur for example in the case of a locked belt reel in the event of a dangerous situation or accident situation.

One of the two bearing sections is preferably a bearing section which is exclusively in contact with the belt reel and a further bearing section of the bearing and is spatially separated from all of the remaining components of the belt retractor. Bearing noises of this bearing section, due to the mechanical separation thereof from the remaining components of the belt retractor, only pass to the outside in a manner which is significantly damped.

Preferably, the two bearing sections differ in terms of radial play relative to the belt reel, on the one hand, and the remaining components of the belt retractor, on the other hand. It is also advantageous if the bearing properties of the two bearing sections differ in their capacity for radial deflection—i.e. transversely to the rotational axis of the belt reel.

It is advantageous, in particular, if one of the two bearing sections is radially fixed and without radial deflection and a further of the two bearing sections has play radially outwardly, is pivotable radially outwardly in a resilient manner and is indirectly or directly retained by the radially fixed bearing section.

A bearing section—hereinafter called the light-duty bearing section—of the bearing is preferably in permanent contact with the section of the reel end mounted therein and thus permanently mounts the reel end. A further bearing section—hereinafter called the heavy-duty bearing section—preferably has a larger internal diameter than the section of the reel end located there and in normal operation is separated by an annular air gap from the reel end; if a belt strap pull-out force acting transversely to the rotational axis of the belt reel exceeds a predetermined threshold—this is hereinafter denoted as heavy-duty operation—the reel end is pulled counter to the spring force of the light-duty bearing section against the heavy-duty bearing section and the mounting of the reel end is additionally carried out by the heavy-duty bearing section.

With regard to minimal noise output to the outside, it is regarded as advantageous if the light-duty bearing section has play both radially and axially and namely in the direction away from the heavy-duty bearing section.

The heavy-duty bearing section is preferably fixed without play both radially and axially and retains the light-duty bearing section in its position.

The bearing is preferably an integral component, in particular a stamped-bent part or a deep-drawn part or an integral plastics part. Particularly preferably, the bearing is an integral plastics bearing.

A component section of the integral bearing preferably forms a light-duty bearing section which is in permanent contact with the section of the reel end mounted therein and permanently mounts the reel end; the light-duty bearing section is preferably exclusively in contact with the belt reel and a further component section and is spatially separated from all of the remaining components of the belt retractor.

A further component section of the integral bearing preferably forms a heavy-duty bearing section which has a larger internal diameter than the section of the reel end located there and in normal operation is separated by an annular air gap from the reel end.

The belt reel is preferably arranged such that in normal operation it is spaced apart from the heavy-duty bearing section both in the radial and in the axial direction; to this end corresponding free spaces are preferably provided.

The internal diameter of the bearing section which is pivotable radially outwardly in a resilient manner, in particular of the light-duty bearing section, is preferably smaller than that of the radially fixed bearing section, in particular of the heavy-duty bearing section.

It is also advantageous if the bearing section which is pivotable radially outwardly in a resilient manner, in particular the light-duty bearing section, and the radially fixed bearing section, in particular the heavy-duty bearing section, are located directly one behind the other in the axial direction and are connected together (indirectly or directly). The two bearing sections are preferably coaxially arranged.

In a further preferred embodiment it is provided that an intermediate section, hereinafter called the spring section, is arranged between the light-duty bearing section and the heavy-duty bearing section. The spring section preferably has a larger internal diameter than the section of the reel end located there and in normal operation is thus separated from the reel end by an internal annular air gap. The spring section is preferably separated radially outwardly by an external annular air gap from the remaining components of the belt retractor and is thus pivotable radially outwardly in a resilient manner. The spring section is preferably retained by the radially fixed bearing section and in turn secures the light-duty bearing section in a resilient manner.

Figure 3:
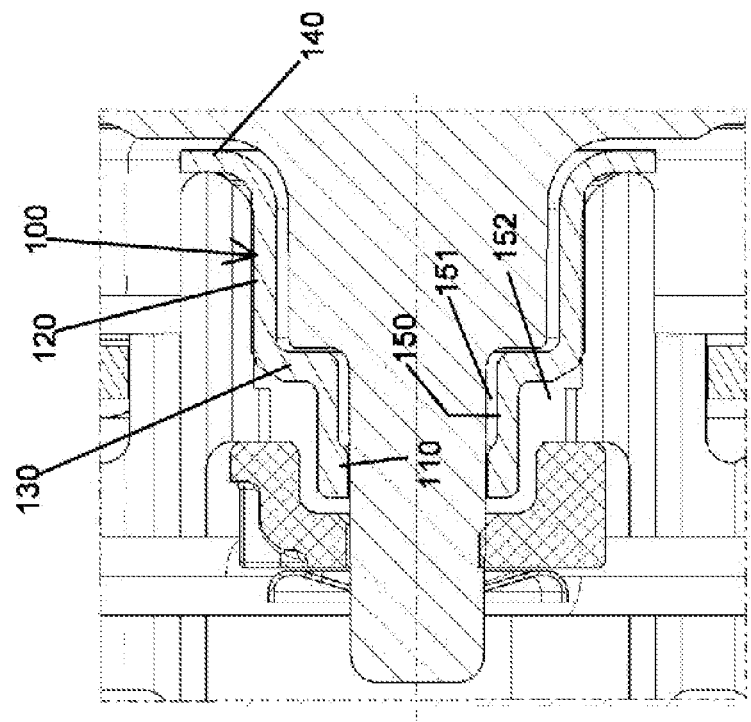
Figure 2:
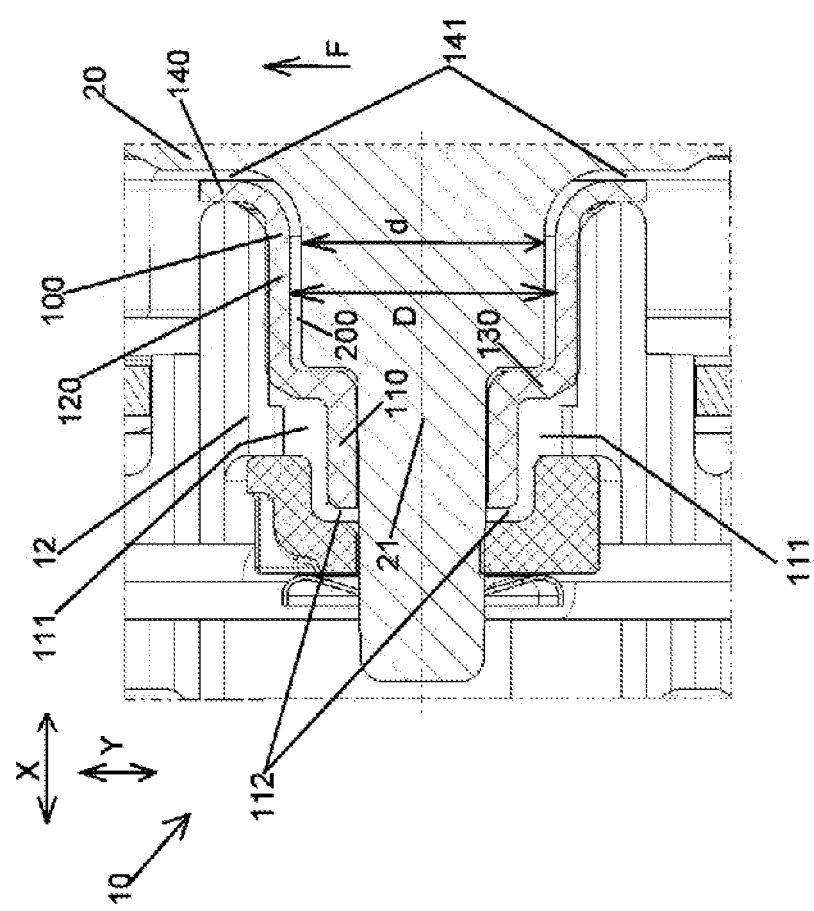

The invention is described in more detail hereinafter with reference to exemplary embodiments; in this case by way of example:

FIG. 1 shows components of an exemplary embodiment of a belt retractor according to the invention with a belt reel in a three-dimensional exploded view, FIG. 2 shows an exemplary embodiment of a bearing which is suitable for mounting a reel end of the belt reel according to FIGS. 1, and FIG. 3 shows a further exemplary embodiment of a bearing suitable for mounting a reel end.

In the figures, for the sake of clarity, the same reference numerals are always used for identical or comparable components.

FIG. 1 shows in a schematic exploded view a belt retractor 10 which, amongst other things, has a belt reel 20, a tensioning drive 30 and an inertia coupling 35 connecting the tensioning drive 30 and the belt reel 20.

FIG. 2 shows in a cross section an exemplary embodiment of a bearing 100, a reel end 21 of the belt reel 20 according to FIG. 1 being able to be mounted thereby. The other reel end of the belt reel 20, not shown in FIG. 2, may be correspondingly mounted in the same manner as the reel end 21.

The bearing 100 is preferably an integral component, preferably a deep-drawn component made of metal or an integral plastics part.

The bearing 100 has a light-duty bearing section 110 which is permanently in contact with the reel end 21 of the belt reel 20 and mounts this reel end 21. The light-duty bearing section 110 has play in the radial direction as is identified in FIG. 2 by an arrow with the reference numeral Y. In order to permit this radial play, a radial free space 111 is provided in the region of the light-duty bearing section 110, said radial free space separating the light-duty bearing section 110 from the remaining components 12 of the belt retractor 10.

Moreover, the light-duty bearing section 110 has play in the axial direction, which in FIG. 2 is identified by an arrow X. The axial play is ensured by an axial free space 112 which in the axial direction separates the light-duty bearing section 110 from the remaining components 12 of the belt retractor 10.

The function of the light-duty bearing section 110 is to mount the reel end 21 of the belt reel 20 in normal operation of the belt retractor; due to the play in the radial direction and in the axial direction the noise development produced by the bearing is low, since sound is not able to be coupled directly to the remaining components 12 of the belt retractor 10 but only indirectly via other bearing sections.

The light-duty bearing section 110 is retained in a radially resilient manner by a heavy-duty bearing section 120 of the bearing 100; the heavy-duty bearing section 120 is connected via a radially outwardly extending connecting section 130 to the light-duty bearing section 110.

In contrast to the light-duty bearing section 110, the heavy-duty bearing section 120 is radially fixed and is retained directly by one or more components 12 of the belt retractor 10. In other words, the heavy-duty bearing section 120 is free of radial deflection.

In order to ensure fixing in the axial direction in the direction of the arrow X, the heavy-duty bearing section 120 is axially retained by a fixing section 140 on the end side, which also in turn bears directly against a component 12 of the belt retractor 10. With regard to minimal noise development, it is advantageous if the belt reel 20 and the fixing section 140 on the end side are separated from one another by a free space 141.

In FIG. 2 it may also be identified that the internal diameter D of the heavy-duty bearing section 120 is larger than the external diameter d of the belt reel 20 in the region of the heavy-duty bearing section 120 so that an annular gap 200 is formed between the heavy-duty bearing section 120 and the belt reel 20. In other words, therefore, the heavy-duty bearing section 120 has radial play relative to the belt reel 20; in normal operation of the belt retractor 10, therefore, the reel end 21 and/or the belt reel 20 has no mechanical contact with the heavy-duty bearing section 120.

In normal operation, the function of the heavy-duty bearing section 120 is thus limited to retaining the light-duty bearing section 110 in a resilient manner via the connecting section 130 and to permit the mounting of the belt reel 20 by the light-duty bearing section 110. The function of the light-duty bearing section 110 is to mount the reel end 21, wherein mechanical vibrations or noises due to the radial spacing from the remaining components 12 of the belt retractor 10 are able to be coupled only via the connecting section 130 and the heavy-duty bearing section 120 to the remaining components 12, so that noise damping which is as effective as possible is achieved.

In other words, the function of the heavy-duty bearing section 120 in normal operation is limited, therefore, to a retaining function for the actively operating and/or actively bearing light-duty bearing section 110.

If a tensile force is produced on the belt reel 20 in the direction of the arrow F in FIG. 2, for example in the case of a locking of the rotation of the belt reel 20 and a forward displacement of the vehicle occupant who is fastened by the safety belt, in a dangerous or accident situation, in the view according to FIG. 2 the belt reel 20 is pulled upwardly counter to the heavy-duty bearing section 120, which is now able to undertake the bearing of the belt reel 20 for this heavy-duty operation; this is possible since the heavy-duty bearing section 120 is in turn radially fixed and thus is not able to avoid the upward movement of the belt reel 20—in contrast to the light-duty bearing section 110. In heavy-duty operation, therefore, the bearing of the reel end 21 is carried out both by the resiliently flexible light-duty bearing section 110 and by the radially fixed, force-bearing heavy-duty bearing section 120.

FIG. 3 shows a further exemplary embodiment of a bearing 100 which is suitable for mounting the reel end 21 of the belt reel 20. The bearing 100 according to FIG. 3 has a resilient intermediate section between the light-duty bearing section 110 and the connecting section 130, hereinafter called the spring section 150, which facilitates the capacity for radial deflection of the light-duty bearing section 110 relative to the radially fixed heavy-duty bearing section 120.

The spring section 150 has a larger internal diameter than the section of the reel end 21 located there, so that in normal operation the spring section is separated by an internal annular air gap 151 from the reel end 21; the spring section 150 is separated by an external annular air gap 152 from the remaining components 12 of the belt retractor 10. Due to the annular air gaps 151 and 152, the spring section 150 is in turn pivotable radially outwardly and inwardly in a resilient manner, whereby—as mentioned—the capacity for radial deflection of the light-duty bearing section 110 is improved. The function of the spring section 150 is thus substantially to retain the light-duty bearing section 110 and to this end in turn to be retained by the radially fixed bearing section 130 and to dampen the sound transmission even further.

Moreover, the above embodiments apply accordingly in connection with FIG. 2.

Whilst the invention has been illustrated further and described in detail by preferred exemplary embodiments, the invention is not limited by the disclosed examples and other variants may be derived therefrom by the person skilled in the art without departing from the protected scope of the invention.

LIST OF REFERENCE NUMERALS

10 Belt retractor
12 Component

20 Belt reel
21 Reel end
30 Tensioning drive
35 Inertia coupling
100 Bearing
110 Light-duty bearing section
111 Free space
112 Free space
120 Heavy-duty bearing section
130 Connecting section
140 Fixing section on end side
141 Free space
150 Spring section
151 Internal annular air gap
152 External annular air gap
200 Annular air gap
d External diameter
D Internal diameter
F Direction of arrow
X Arrow
Y Arrow

The invention claimed is:

1. A belt retractor (10) for a safety belt device, comprising a belt reel (20) for winding and unwinding the safety belt, characterized in that
at least one reel end (21) of the belt reel (20) is mounted in a bearing which comprises at least two bearing sections (110, 120, 150) having different play; and
one of the two bearing sections (110) is a bearing section which is exclusively in contact with the belt reel (20) and the other bearing section of the bearing (100) and is spatially separated from all of the remaining components (12) of the belt retractor.

2. The belt retractor (10) as claimed in claim 1, characterized in that the radial play of the two bearing sections (110, 120, 150) relative to the belt reel (20) is different than the radial play of the two bearing sections relative to the remaining components (12) of the belt retractor (10).

3. The belt retractor (10) as claimed in claim 1, characterized in that the bearing properties of the two bearing sections (110, 120) differ in their capacity for deflection in a direction transverse to the rotational axis of the belt reel (20).

4. The belt retractor (10) as claimed in claim 1, characterized in that
the bearing is an integral plastics bearing,
a component section forms a light-duty bearing section (110) which is in permanent contact with the section of the reel end (21) mounted therein, and permanently mounts the reel end (21), wherein the light-duty bearing section (110) is exclusively in contact with the belt reel (20) and a further component section and is spatially separated from all of the remaining components (12) of the belt retractor (10), and
a further component section forms a heavy-duty bearing section (120) which has a larger internal diameter than the section of the reel end (21) located there and in normal operation is separated by an annular air gap (200) from the reel end (21).

5. The belt retractor (10) as claimed in claim 4, characterized in that the belt reel (20) is arranged such that in normal operation it is spaced apart from the heavy-duty bearing section (120) both in the radial and in the axial direction.

6. The belt retractor (10) as claimed in claim 1, characterized in that one of the bearing sections is configured to move radially outwardly in a resilient manner and another one of the bearing sections is a fixed bearing section; and
the internal diameter of the bearing section which is configured to move radially outwardly in a resilient manner is smaller than that of the radially fixed bearing section.

7. The belt retractor (10) as claimed in claim 6, characterized in that
the bearing section which is configured to move radially outwardly in a resilient manner includes a light-duty bearing section (110), and the radially fixed bearing section includes a heavy-duty bearing section (120), and wherein the two bearing sections are located directly one behind the other in the axial direction and are connected together and wherein
the two bearing sections (110, 120) are coaxially arranged.

8. The belt retractor (10) as claimed in claim 6, characterized in that an intermediate section, hereinafter called the spring section (150), is arranged between the light-duty bearing section (110) and the heavy-duty bearing section (120), which
has a larger internal diameter than the section of the reel end (21) located there and in normal operation is separated by an internal annular air gap (151) from the reel end (21),
is separated radially outwardly by an external annular air gap (152) from the remaining components (12) of the belt retractor (10) and is configured to move radially outwardly in a resilient manner and
is retained indirectly or directly by the radially fixed heavy-duty bearing section (120) and retains the light-duty bearing section (110) in a resilient manner.

9. The belt retractor (10) as claimed in claim 6, characterized in that the bearing section which is configured to move radially outwardly in a resilient manner is a light-duty bearing section (110), and the radially fixed bearing section is a heavy-duty bearing section (120).

10. A belt retractor (10) for a safety belt device, comprising a belt reel (20) for winding and unwinding the safety belt, characterized in that
at least one reel end (21) of the belt reel (20) is mounted in a bearing which comprises at least two bearing sections (110, 120, 150) having different play,
mone of the two bearing sections (120) is radially fixed and without radial deflection and the other a further of the two bearing sections (110, 150) has play radially outwardly and is configured to move in a resilient manner and is indirectly or directly retained by the radially fixed bearing section.

11. A belt retractor (10) for a safety belt device, comprising a belt reel (20) for winding and unwinding the safety belt, characterized in that
at least one reel end (21) of the belt reel (20) is mounted in a bearing which comprises at least two bearing sections (110, 120, 150) having different play,
one of the bearing sections includes a light-duty bearing section and is in permanent contact with the section of the reel end (21) mounted therein and permanently mounts the reel end (21),
one of the bearing sections includes a heavy-duty bearing section and has a larger internal diameter (D) than the section of the reel end (21) located there, and in normal operation is separated by an annular air gap (200) from the reel end (21),
wherein if a belt strap pull-out force acting transversely to the rotational axis of the belt reel (20) exceeds a predetermined threshold, the reel end (21) is pulled counter to the spring force of the light-duty bearing section (110) against the heavy-duty bearing section (120) and the mounting of the reel end (21) is additionally carried out by the heavy-duty bearing section (120).

12. The belt retractor (10) as claimed in claim 11, characterized in that the light-duty bearing section (110) has play in both a radial direction and in an axial direction.

13. The belt retractor (10) as claimed in claim 11, characterized in that the heavy-duty bearing section (120) is fixed without play both radially and axially and retains the light-duty bearing section (110).

14. The belt retractor (10) as claimed in claim 11, characterized in that an intermediate section, hereinafter called the spring section (150), is arranged between the light-duty bearing section (110) and the heavy-duty bearing section (120), which

- has a larger internal diameter than the section of the reel end (21) located there and in normal operation is separated by an internal annular air gap (151) from the reel end (21),
- is separated radially outwardly by an external annular air gap (152) from the remaining components (12) of the belt retractor (10) and is configured to move radially outwardly in a resilient manner and
- is retained indirectly or directly by the radially fixed heavy-duty bearing section (120) and in turn retains the light-duty bearing section (110) in a resilient manner.

* * * * *